(12) United States Patent
Kim et al.

(10) Patent No.: US 10,430,063 B2
(45) Date of Patent: Oct. 1, 2019

(54) INPUT APPARATUS FOR VEHICLE HAVING METAL BUTTONS AND CONTROL METHOD OF THE INPUT APPARATUS

(71) Applicants: HYUNDAI MOTOR COMPANY, Seoul (KR); KIA MOTORS CORPORATION, Seoul (KR)

(72) Inventors: Kye Yoon Kim, Gunpo-si (KR); HeeJin Ro, Seoul (KR); Gi Beom Hong, Bucheon-si (KR); Seok-young Youn, Seoul (KR); Gideok Kwon, Seoul (KR); Jong Bok Lee, Suwon-si (KR); Donghee Seok, Suwon-si (KR)

(73) Assignees: HYUNDAI MOTOR COMPANY, Seoul (KR); KIA MOTORS COPORATION, Seoul (KR)

( * ) Notice: Subject to any disclaimer, the term of this patent is extended or adjusted under 35 U.S.C. 154(b) by 39 days.

(21) Appl. No.: 15/836,037

(22) Filed: Dec. 8, 2017

(65) Prior Publication Data

US 2019/0095082 A1  Mar. 28, 2019

(30) Foreign Application Priority Data

Sep. 27, 2017 (KR) .......................... 10-2017-0125096

(51) Int. Cl.
*G06F 3/0484* (2013.01)
*G06F 3/0488* (2013.01)
(Continued)

(52) U.S. Cl.
CPC .......... *G06F 3/04847* (2013.01); *B60K 37/06* (2013.01); *G06F 3/017* (2013.01);
(Continued)

(58) Field of Classification Search
CPC ........ G06F 3/044; G06F 3/048; G06F 3/0488; G06F 3/04845; G06F 3/0487;
(Continued)

(56) References Cited

U.S. PATENT DOCUMENTS 6,240,347 B1 * 5/2001 Everhart ................ B60K 35/00
  367/197
8,258,986 B2 * 9/2012 Makovetskyy ......... G06F 3/044
  341/33

(Continued)

FOREIGN PATENT DOCUMENTS

JP  2013/186662 A  9/2013
KR  10-2014-0130743  11/2014
(Continued)

*Primary Examiner* — Darlene M Ritchie
(74) *Attorney, Agent, or Firm* — Morgan, Lewis & Bockius LLP

(57) ABSTRACT

An input apparatus includes an operating portion including a plurality of metal buttons for receiving a manipulation command, a display for visually providing a control command created based on an output signal from the operating portion, and a controller for converting the operating portion to an active state if a predetermined first manipulation command is input to the operating portion, and for controlling the display to provide an increment adjustment screen in which a predetermined first increment has been adjusted if a predetermined drag touch is input to the operating portion.

14 Claims, 13 Drawing Sheets

(51) Int. Cl.
   *G06F 3/01* (2006.01)
   *B60K 37/06* (2006.01)
   *G06F 3/0487* (2013.01)

(52) U.S. Cl.
   CPC .......... *G06F 3/0487* (2013.01); *G06F 3/0488* (2013.01); *G06F 3/04845* (2013.01); *G06F 3/04883* (2013.01); *B60K 2370/146* (2019.05)

(58) Field of Classification Search
   CPC . G06F 3/017; B60K 35/00; B60K 2350/1052; B60K 37/00; B60K 37/02; B60K 37/0604; B60K 37/06
   See application file for complete search history.

(56) References Cited

U.S. PATENT DOCUMENTS

| | | | | |
|---|---|---|---|---|
| 8,537,119 | B1* | 9/2013 | Grivna | G06F 3/016 |
| | | | | 345/169 |
| 8,769,410 | B2* | 7/2014 | Park | G06F 3/04847 |
| | | | | 715/720 |
| 2008/0196945 | A1* | 8/2008 | Konstas | G06F 3/03547 |
| | | | | 178/18.03 |
| 2009/0184920 | A1* | 7/2009 | Francis | G06F 3/03547 |
| | | | | 345/156 |
| 2009/0225036 | A1* | 9/2009 | Wright | G06F 3/0416 |
| | | | | 345/173 |
| 2014/0189597 | A1* | 7/2014 | Kang | G06F 3/04817 |
| | | | | 715/835 |
| 2015/0041299 | A1 | 2/2015 | Suzuki et al. | |
| 2015/0291036 | A1* | 10/2015 | Ryu | B60L 1/00 |
| | | | | 701/22 |
| 2016/0306482 | A1* | 10/2016 | Gmyr | G09G 3/36 |
| 2016/0349823 | A1* | 12/2016 | Killo | G06F 1/3234 |
| 2017/0024119 | A1 | 1/2017 | Wild et al. | |
| 2017/0357317 | A1* | 12/2017 | Chaudhri | G06F 3/0412 |
| 2017/0357362 | A1* | 12/2017 | Shim | G06F 1/169 |
| 2018/0088770 | A1* | 3/2018 | Brombach | B60K 35/00 |
| 2018/0121008 | A1* | 5/2018 | Teoh | H03K 17/9622 |
| 2018/0136738 | A1* | 5/2018 | Argiro | G06F 1/1626 |
| 2018/0267637 | A1* | 9/2018 | Wild | B60K 37/06 |
| 2018/0273050 | A1* | 9/2018 | Tertoolen | B60R 1/00 |
| 2018/0276519 | A1* | 9/2018 | Benkley, III | G06K 9/0002 |
| 2018/0309445 | A1* | 10/2018 | Lipkovich | G06F 3/0202 |

FOREIGN PATENT DOCUMENTS

| | | |
|---|---|---|
| KR | 10-1521690 B1 | 5/2015 |
| KR | 10-2017-0001108 | 1/2017 |
| KR | 10-2017-0032820 | 3/2017 |

* cited by examiner

INPUT APPARATUS FOR VEHICLE HAVING METAL BUTTONS AND CONTROL METHOD OF THE INPUT APPARATUS

CROSS-REFERENCE TO RELATED APPLICATION

This application claims the benefit of priority to Korean Patent Application No. 10-2017-0125096, filed on Sep. 27, 2017 with the Korean Intellectual Property Office, the entire disclosure of which is incorporated herein by reference.

TECHNICAL FIELD

Exemplary embodiments of the present disclosure relate to an input apparatus and a control method thereof, and more particularly, to an input apparatus provided in the form of metal buttons to receive a user's touch gestures, and a method of controlling the input apparatus.

BACKGROUND

A vehicle commonly includes a cluster to display driving functions and vehicle information, such as vehicle speed, engine Revolutions Per Minute (RPM), fuel flow, cooling water, etc.

The vehicle can provide an audio function, a video function, a navigation function, an air-conditioning function, a seat control function and a lighting control function, in addition to a driving function.

Recently, studies into various input apparatuses for enabling a user to more easily load the functions of the vehicle to safely and conveniently control the functions have been conducted.

SUMMARY

Therefore, it is an aspect of the present disclosure to provide an input apparatus provided in the form of metal buttons and configured to implement a capacitive touch gesture interface on the surface of the metal, and a method of controlling the input apparatus.

Additional aspects of the disclosure will be set forth in part in the description which follows and, in part, will be obvious from the description, or may be learned by practice of the disclosure.

In accordance with one aspect of the present disclosure, an input apparatus may comprise an operating portion including a plurality of metal buttons configured to receive an input of a manipulation command; a display configured to visually provide a control command created based on an output signal from the operating portion; and a controller configured to convert the operating portion to an active state if a predetermined first manipulation command is input to the operating portion, and to control the display to provide an increment adjustment screen in which a predetermined first increment has been adjusted, if a predetermined drag touch is input to the operating portion.

In the operating portion, the plurality of metal buttons may be arranged side by side.

The drag touch may be input according to an arrangement of the plurality of metal buttons.

The drag touch may be input in a predetermined first direction or in a predetermined second direction that is opposite to the predetermined first direction, according to an arrangement of the plurality of metal buttons.

If a predetermined first manipulation command is input to the operating portion, the controller may convert the operating portion to an active state to receive an operating command for a function corresponding to a metal button to which the predetermined first manipulation command is input, among the plurality of metal buttons included in the operating portion.

If a predetermined second manipulation command is input to the operating portion after the operating portion is activated, the controller may control the display to provide a new increment adjustment screen having an adjustment increment that is different from an adjustment increment of an increment adjustment screen provided thereon.

If the second manipulation command is input to the operating portion, the display may provide a new increment adjustment screen having an adjustment increment that is different from an adjustment increment of an increment adjustment screen provided thereon.

The display increment may provide a new increment adjustment screen having an adjustment increment that is smaller than the adjustment increment of the increment adjustment screen provided thereon.

If a predetermined drag touch is input to the operating portion when a plurality of functions of a vehicle are being executed, the display may provide a preview screen for predetermined functions.

The increment adjustment screen may include at least one of a volume increment adjustment screen of audio, a reproducing increment adjustment screen of audio, a progress bar adjustment screen of audio, a temperature increment adjustment screen of an air conditioner, an air-volume increment adjustment screen of an air conditioner, and a frequency increment adjustment screen of radio.

Each of the metal buttons may include a sensor, and a metal cover disposed on the sensor and configured to receive an input of a user's manipulation command.

In accordance with another aspect of the present disclosure, a method of controlling an input apparatus, the method may comprise converting the operating portion to an active state, if a predetermined first manipulation command is input to the operating portion; and providing an increment adjustment screen in which a predetermined first increment has been adjusted on the display, if a predetermined drag touch is input to the operating portion.

The converting of the operating portion to the active state may comprise, if a predetermined first manipulation command is input to the operating portion, converting the operating portion to the active state in order to receive an operating command for a function corresponding to a metal button to which the first manipulation is input, among the plurality of metal buttons included in the operating portion.

The method may further comprise, if a predetermined second manipulation command is input to the operating portion converted to the active state, providing a new increment adjustment screen having an adjustment increment that is different from an adjustment increment of an increment adjustment screen provided on the display.

The providing of the new increment adjustment screen may comprise providing a new increment adjustment screen having an adjustment increment that is smaller than the adjustment increment of the increment adjustment screen provided on the display.

The providing of the increment adjustment screen may comprise providing an increment adjustment screen including at least one of a volume increment adjustment screen of audio, a reproducing increment adjustment screen of audio, a progress bar adjustment screen of audio, a temperature increment adjustment screen of an air conditioner, an air-volume increment adjustment screen of an air conditioner, and a frequency increment adjustment screen of radio.

The method may further comprise, if a predetermined drag touch is input to the operating portion when a plurality of functions of a vehicle are being executed, providing a preview screen for predetermined functions.

In the operating portion, the plurality of metal buttons may be arranged side by side, and the drag touch is input according to an arrangement of the plurality of metal buttons.

The drag touch may be input in a predetermined first direction or in a predetermined second direction that is opposite to the predetermined first direction, according to an arrangement of the plurality of metal buttons.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
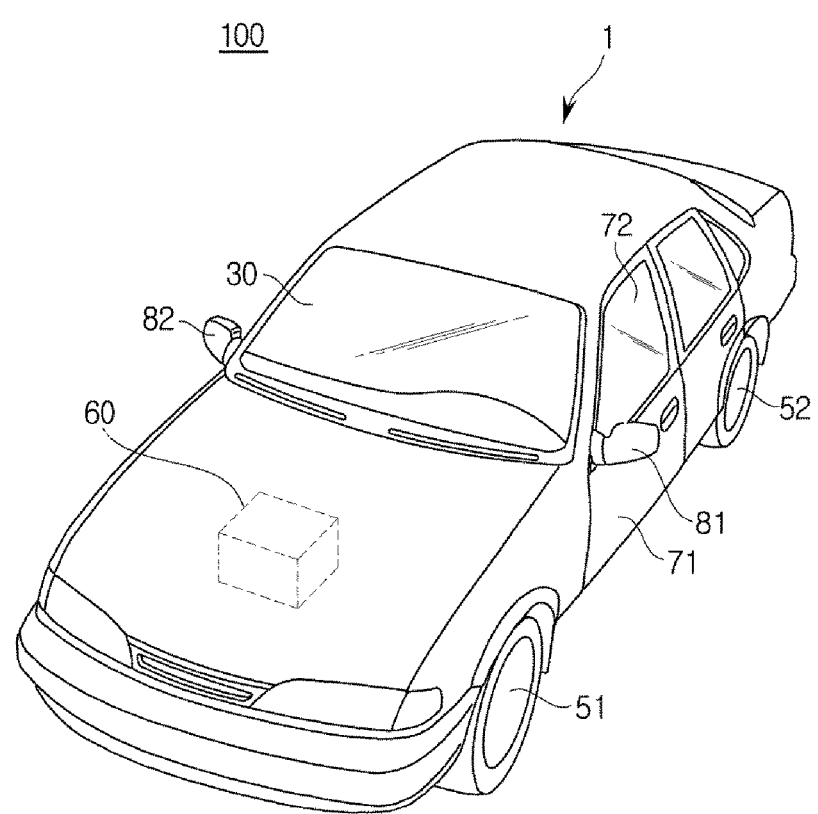
FIG. 1 shows an exterior of a vehicle according to exemplary embodiments of the present disclosure.

Like numbers refer to like components throughout this specification. This specification does not describe all components of the embodiments, and general information in the technical field to which the present disclosure belongs or overlapping information between the embodiments will not be described.

Also, it will be understood that when the terms "includes," "comprises," "including," and/or "comprising," when used in this specification, specify the presence of a stated component, but do not preclude the presence or addition of one or more other components.

In the present specification, it will also be understood that when an element is referred to as being "on" or "over" another element, it can be directly on the other element or intervening elements may also be present.

Also, it will be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

Hereinafter, exemplary operation principles and embodiments of the present disclosure will be described with reference to the accompanying drawings.

An input apparatus and a control method thereof according to the present disclosure enable a user to conveniently control functions installed in a vehicle. Hereinafter, for convenience of description, a configuration of a vehicle to which the input apparatus according to the present disclosure is applied will be briefly described, and then the input apparatus according to the present disclosure will be described.

FIG. 1 shows an exterior of a vehicle according to exemplary embodiments of the present disclosure.

Referring to FIG. 1, a vehicle 100 may include a main body 1 forming an outer appearance of the vehicle 100, a front glass 30 to provide a driver inside the vehicle 100 with a front view of the vehicle 100, a plurality of wheels 51 and 52 to move the vehicle 100, a driving apparatus 60 to rotate the wheels 51 and 52, a plurality of doors 71 to shield the interior of the vehicle 100 from the outside, and a plurality of side-view mirrors 81 and 82 to provide the driver with rear views of the vehicle 100.

The front glass 30 may be provided in the upper, front portion of the main body 1 to allow the driver inside the vehicle 100 to acquire a front view of the vehicle 100. The front glass 30 is also called a windshield glass.

The wheels 51 and 52 may include front wheels 51 provided in the front portion of the vehicle 100, and rear wheels 52 provided in the rear portion of the vehicle 100. The driving apparatus 60 may provide rotatory power to the front wheels 51 or the rear wheels 52 so that the main body 1 moves forward or backward. The driving apparatus 60 may use an engine to burn fossil fuels to produce rotatory power, or a motor to receive power from a condenser (not shown) and/or a battery to produce rotatory power.

The doors 71 may be rotatably provided to the left and right of the main body 1 to allow the driver to open one of them and get into the vehicle 100. Also, the doors 71 may shield the interior of the vehicle 100 from the outside when they are closed.

Each door 71 may include a window 72 to enable the driver or a passenger to look out outside or to enable a person to look in inside. According to an embodiment, the window 72 may enable a person either to look in inside or to look out outside. Also, the window 72 may be opened or closed.

The side-view mirrors 81 and 82 may include a left side-view mirror 81 provided to the left of the main body 1 and a right side-view mirror 82 provided to the right of the main body 1, to allow the driver inside the vehicle 100 to acquire visual information of side and rear views of the vehicle 100.

Figure 2:
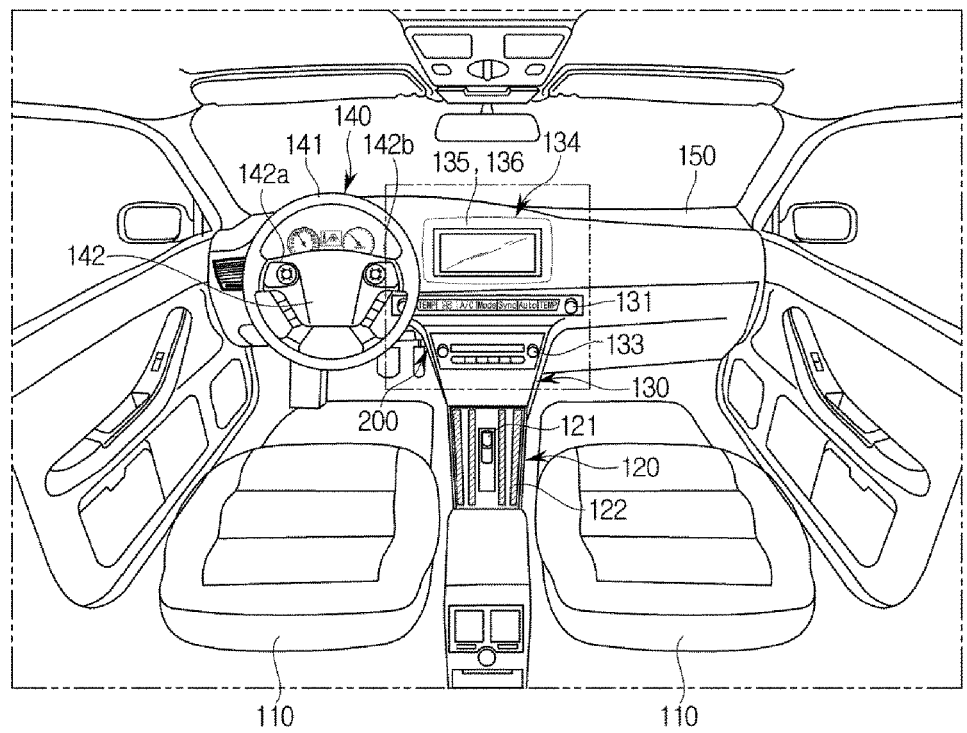
FIG. 2 shows an interior of a vehicle according to exemplary embodiments of the present disclosure.

FIG. 2 shows an internal configuration of a vehicle according to exemplary embodiments of the present disclosure.

As shown in FIG. 2, the vehicle 100 may include a plurality of seats 110 on which a driver and a passenger sit, and a dashboard 150 in which a gear box 120, a center fascia 130, a steering wheel 140, etc. are installed.

In the gear box 120, a gear lever 121 for shifting gears, and a touch bar 122 for controlling execution of functions of the vehicle 100 may be installed. The touch bar 122 may recognize a user's touch by a capacitive method to receive a command for performing a function of the vehicle 100. As shown in FIG. 2, a plurality of touch bars 122 may be provided, and the number and shape of the touch bars 122 may change as necessary.

In the center fascia 130, an air conditioner 131, an audio system 133, an Audio Video Navigation (AVN) system 134, etc. may be installed.

The air conditioner 131 may adjust the temperature, humidity, air quality, and flow of air inside the vehicle 100 to maintain the inside of the vehicle 100 pleasant. The air conditioner 131 may include at least one vent (not shown) installed in the center fascia 130 to discharge air. In the center fascia 130, an input apparatus 200 including at least one button for controlling the air conditioner 131 may be provided. A description of the input apparatus 200 will be provided below.

The audio system 133 may provide a radio mode to provide a radio function, and a media mode to reproduce an audio file stored in various storage medium that stores audio files. In the center fascia 130, the input apparatus 200 including at least one button for controlling the audio apparatus 133 may be provided. A description about the input apparatus 200 will be provided below.

The AVN system 134 may be embedded in the center fascia 130 of the vehicle 100. The AVN system 134 can perform an audio function, a video function, and a navigation function according to a user's manipulation. The AVN system 134 may include an input device 135 to receive a user command related to the AVN system 134, and a display 136 to display a screen related to the audio function, a screen related to the video function, or a screen related to the navigation function. The display 136 of the AVN system 134 may be provided as a display of the input apparatus 200 according to the present disclosure. However, a display of the input apparatus 200 is not limited to the display 136 of the AVN system 134.

The steering wheel 140, which is used to change the driving direction of the vehicle 100, may include a rim 141 that is gripped by a driver, and a spoke 142 connected to a steering apparatus of the vehicle 100 and connecting the rim 141 to a hub of a rotation axis for steering. According to exemplary embodiments, control apparatuses 142a and 142b for controlling various systems (for example, the audio system 133) in the vehicle 100 may be mounted on the spoke 142.

Also, the dashboard 150 may further include various instrument panels to display driving speed, Revolutions per Minute (RPM) of the engine, a fuel level, etc., and a globe box to store various things, according to various embodiments.

Figure 3:
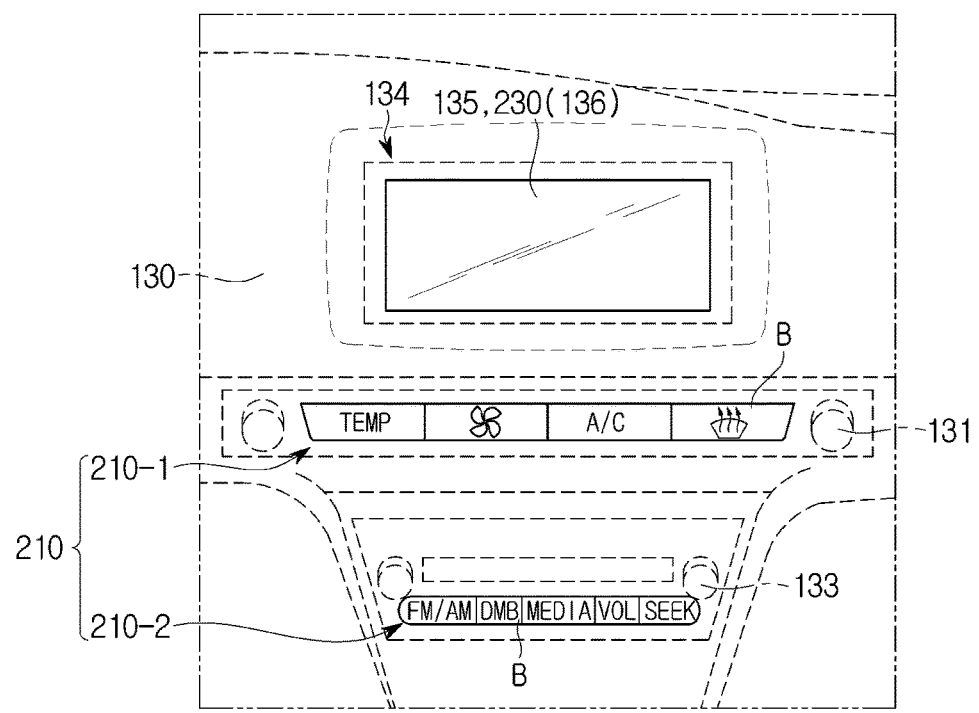
FIG. 3 is an enlarged view of an input apparatus according to exemplary embodiments of the present disclosure.
Figure 4:
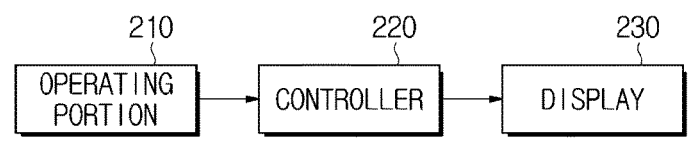
FIG. 4 is a control block diagram of an input apparatus according to exemplary embodiments of the present disclosure.

Hereinafter, the input apparatus 200 provided in the inside of the vehicle 100 will be described in more detail. FIG. 3 is an enlarged view of an input apparatus according to exemplary embodiments of the present disclosure, and FIG. 4 is a control block diagram of an input apparatus according to exemplary embodiments of the present disclosure.

Referring to FIG. 3, the input apparatus 200 according to exemplary embodiments of the present disclosure may be embedded into the center fascia 130 of the vehicle 100.

The input apparatus 200 according to embodiments of the present disclosure may include an operating portion 210 including a plurality of metal buttons B for receiving inputs of manipulation commands from a user, and a display 230 for visually providing a control command generated based on an output signal from the operating portion 210.

The operating portion 210 may include a first operating portion 210-1 and a second operating portion 210-2 arranged in two lines in the center of the center fascia 130. However, the operating portion 210 may be disposed at any area in the inside of the vehicle 100, and also the number and locations of the buttons B included in the operating portion 210 may change for the purpose of a user's convenience in manipulating them.

In the operating portion 210, the plurality of metal buttons B may be arranged side by side. In FIG. 3, for convenience of description, an example in which the plurality of metal buttons B is arranged in a left-right direction is shown. However, the plurality of metal buttons B may be arranged in an up-down direction or in a diagonal direction. According to some embodiments, the plurality of metal buttons B may be arranged in a curved arrangement.

Each metal button B may include a sensor, and a metal cover disposed on the sensor and configured to receive a user's manipulation command. The sensor may collect information about a change in capacitance of the metal cover generated when a user's finger touches an upper surface of the metal cover. The sensor may be a capacitive sensor, although the disclosure is not limited thereto.

Each metal button B may receive a user's touch on the metal button B, and also, may receive a user's drag touch of sequentially rubbing the upper surfaces of a plurality of metal buttons B. Also, each metal button B can determine a length of a user' touch thereon, and as a result, the metal button B can distinguish various kinds of touch gestures.

The display 230 may visually provide a control command generated based on an output signal from the operating portion 210. The display 230 of the input apparatus 200 may be the display 136 of the AVN system 134, and the following description will be given under an assumption that the display 230 of the input apparatus 200 is the display 136 of the AVN system 134.

Hereinafter, a configuration of the input apparatus 200 will be described in more detail. As shown in FIG. 4, the input apparatus 200 according to exemplary embodiments may include the operating portion 210, the display 230, and a controller 220.

The operating portion 210 may include the plurality of metal buttons B to receive manipulation commands of a user. In the present specification, a manipulation command is a concept including a touch input and a pressed input. In other words, the metal buttons B may be manipulated in a way to be touched by a user, and according to another embodiment, may be manipulated in a way to be pressed by a user. Meanwhile, user's touch inputs can be divided as follows.

First, a "touch" means a gesture of contacting a surface of a metal button B with a user's finger. Also, a "long touch" means a gesture of contacting a surface of a metal button B with a user's finger for a long time period than a time period for which the "touch" is made. Also, a "drag touch" means a gesture of rubbing the surfaces of a plurality of metal buttons B with a user' finger. However, the kinds of touches that can be received by the operating portion 210 are not limited to these, and the operating portion 210 may receive a "short touch", a "double touch", etc. according to a designer's intention.

If a user's manipulation command is received through the operating portion 210, the sensor may collect information of the user's manipulation command, and output the collected information to the controller 220.

The controller 220 may be configured with memory (not shown) to store algorithms for controlling operations of components in the input apparatus 200 or data for programs for executing the algorithms, and a processor to perform the above-described operations using data stored in the memory. The memory and processor may be implemented as separate chips, or integrated into a single chip.

The controller 220 may decide a controlled target and a control command based on sensor value information collected by the sensors of the operating portion 210.

If a predetermined first manipulation command T1 is input to the operating portion 210, the controller 220 may convert the operating portion 210 to an active state. In other words, if the controller 220 receives a sensor value created by a first manipulation command T1 from a metal button B of the plurality of metal buttons B, the controller 220 may convert the operating portion 210 to an active state. Here, the first manipulation command T1 may include a manipulation command in a manner that the metal buttons B are pressed, but the present disclosure is not limited thereto. The operating portion 210 may be in an inactive state when no touch is made thereon. If the operating portion 210 is converted to an active state, the operating portion 210 may become a state in which it can recognize a user's drag touch. The input apparatus 200 may perform operation of converting the operating portion 210 to an active state, before receiving a touch command, in order to improve accuracy in manipulating the input apparatus 200 while preventing the vehicle 100 from operating wrongly due to an unnecessary touch.

If a predetermined drag touch is received from the operating portion 210, the controller 220 may control the display 230 to provide an increment adjustment screen in which a predetermined first increment has been adjusted. The operating portion 210 may perform the control after it is converted to an active state.

The increment adjustment screen means an adjustment screen for functions requiring increment adjustment among a plurality of functions of the vehicle 100. For example, the increment adjustment screen may include at least one of a volume increment adjustment screen of audio, a reproducing increment adjustment screen of audio, a progress bar adjustment screen of audio, a temperature increment adjustment screen of the air conditioner 131, an air-volume increment adjustment screen of the air conditioner 131, and a frequency increment adjustment screen of radio. Hereinafter, examples of increment adjustment for each increment adjustment screen will be described with reference to exemplary embodiments.

A first increment may be decided according to the functions of the vehicle 100. A first increment for an audio function may be five increments of audio volume. According to an embodiment, the first increment for the audio function may be a reproduction increment of audio, or five increments of the progress for currently played music. According to another example, a first increment for an air-conditioning function may be five increments of temperature, or five increments of air volume. The five increments used herein are aimed to describe an example of increment adjustment of a new increment adjustment screen which will be described below, and the number of the first increment is not limited to five.

The drag touch means an input gesture of touching the plurality of metal buttons B along the arrangement of the metal buttons B. More specifically, the drag touch means a gesture of touching the plurality of metal buttons B in a predetermined first direction or in a predetermined second direction that is opposite to the first direction, according to the arrangement of the metal buttons B. The first direction and the second direction may be set to an up-down direction or a left-right direction according to the arrangement of the plurality of metal buttons B. Meanwhile, according to an embodiment, if the plurality of metal buttons B is arranged in the shape of a circle, the first direction and the second direction may be a clockwise direction and a counterclockwise direction, and if the plurality of metal buttons B are arranged diagonally, the first direction and the second direction may be a diagonal direction.

If a predetermined second manipulation command T2 is input to the operating portion 210 after the operating portion 210 is activated, the controller 220 may control the display 230 to provide a new increment adjustment screen having an adjustment increment that is different from the adjustment increment of the increment adjustment screen provided thereon. The second manipulation command T2 may be implemented in the form of a touch input which is input for a long time period, that is, a long touch, but the present disclosure is not limited thereto. The display 230 may provide a new increment adjustment screen in which an adjustment increment (for example, a second increment) that is different from the adjustment increment of the increment adjustment screen provided thereon has been adjusted.

The second increment of the new increment adjustment screen may be smaller than the first increment that is the adjustment increment of the previous increment adjustment screen. For example, if the first increment for the air-conditioning function is set to five increments of temperature, the second increment may be set to one or four increments of temperature. Meanwhile, according to another embodiment, the second increment may be larger than the first increment.

If a predetermined drag touch is input to the operating portion 210 when a plurality of functions of the vehicle 100 are being executed, the controller 220 may control the display 230 to provide a preview screen for predetermined functions. For example, if a drag gesture is input along the upper surfaces of the plurality of metal buttons B of the operating portion 210 when a destination guiding screen is displayed on the display 230, a preview screen for predetermined functions may be displayed together with the destination guiding screen on the display 230. The operation will be described in detail, later.

So far, the configuration of the input apparatus 200 has been described. Hereinafter, a method of controlling the input apparatus 200 according to the present disclosure will be described with reference to the accompanying drawings.

Figure 5:
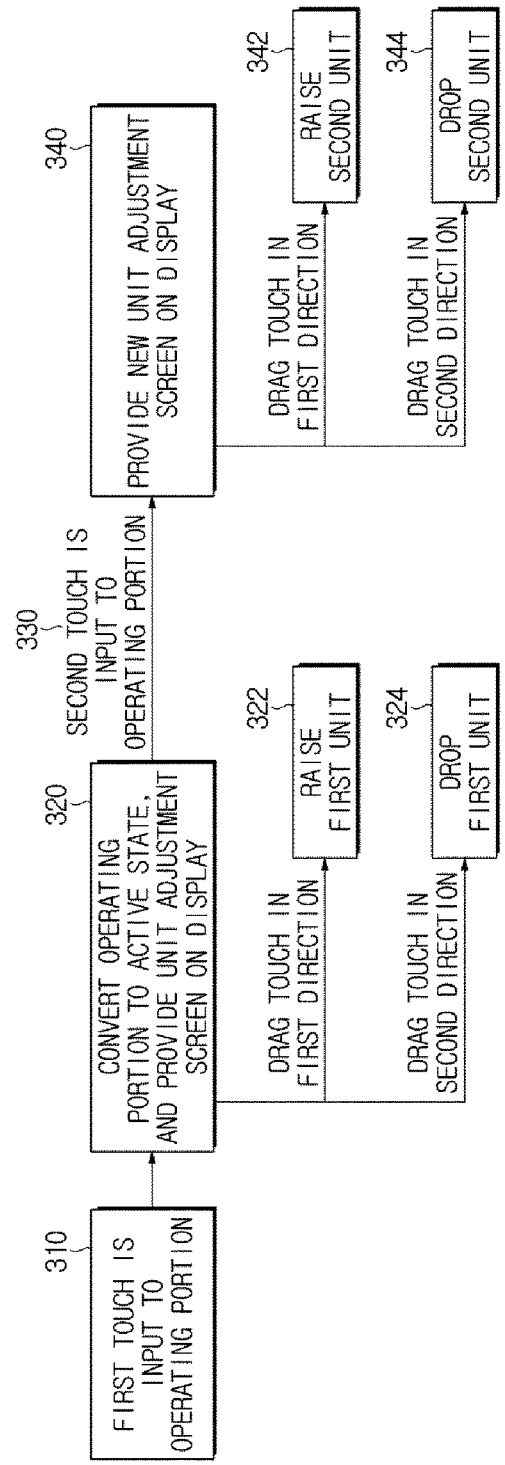
FIG. 5 is a flowchart illustrating an operation principle of an input apparatus according to exemplary embodiments of the present disclosure.
Figure 6:
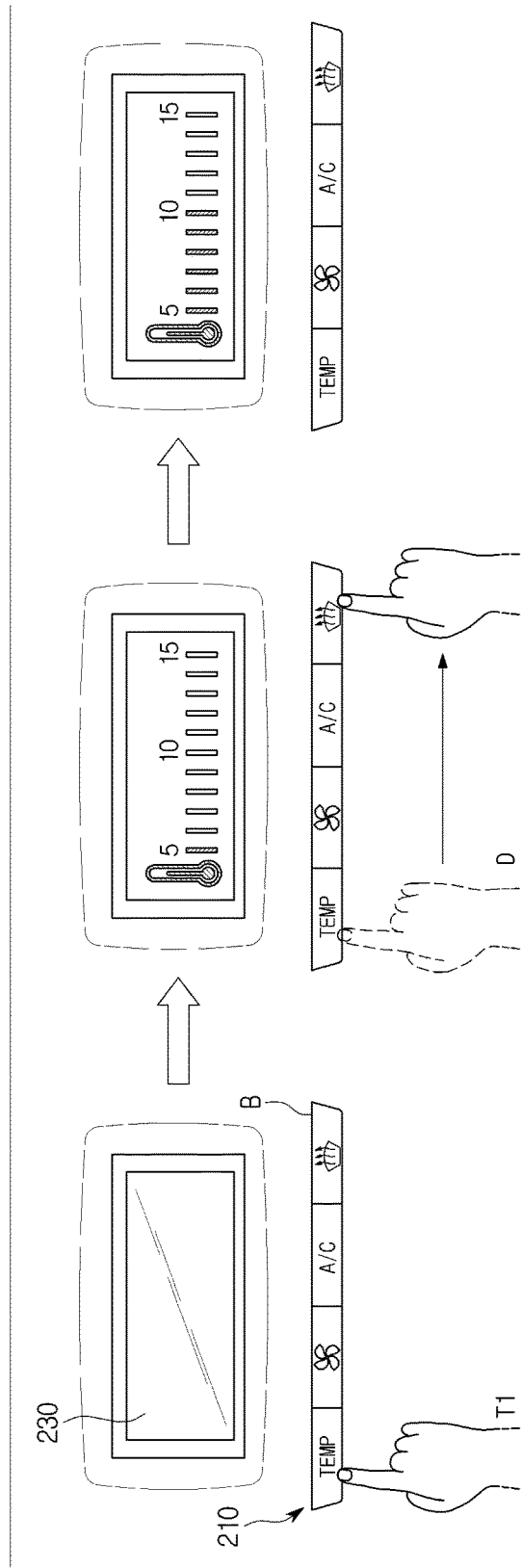
FIGS. 6 and 7 are views for describing an operation principle of an input apparatus according to exemplary embodiments of the present disclosure.
Figure 7:
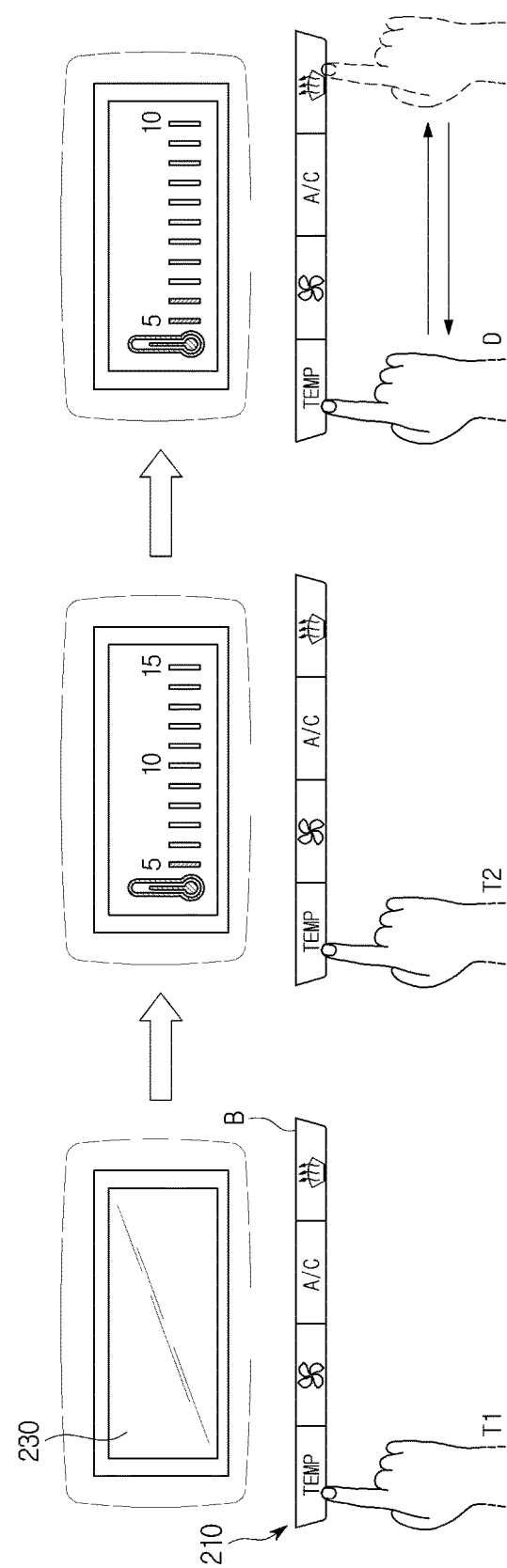

FIG. 5 is a flowchart illustrating an operation principle of the input apparatus according to exemplary embodiments of the present disclosure, and FIGS. 6 and 7 are views for describing an operation principle of the input apparatus according to exemplary embodiments of the present disclosure.

Referring to FIG. 5, if a predetermined first manipulation command T1 is input to a metal button B of the operating portion 210, the operating portion 210 may be converted to an active state, and an increment adjustment screen for a function corresponding to the metal button B may be displayed on the display 230, in operations 310 and 320. The increment adjustment screen displayed when the first manipulation command T1 is input may be a function adjustment screen in which a predetermined first increment can be adjusted.

For example, if a user's first manipulation command T1 is input to a metal button B related to a temperature adjustment function of the air conditioner 131, the display 230 may display a temperature increment adjustment screen of the air conditioner 131. Referring to FIG. 6, a temperature increment adjustment screen of the air conditioner 131, provided by the first manipulation command T1 may be an increment adjustment screen on which temperature can be adjusted in a predetermined first increment, for example, in increments of 5 degrees. In some embodiments, the first increment may change according to a user's setting. Hereinafter, for convenience of description, an example in which a first increment is set to 5 degrees in regard of temperature increment adjustment of the air conditioner 131 will be described as an embodiment of the present disclosure.

Then, if a predetermined drag touch is input to the operating portion 210, the display 230 may provide an increment adjustment screen in which a predetermined first increment has been adjusted, in operation 322 or 324.

For example, in the case in which the plurality of metal buttons B are arranged side by side, a drag touch D may be input in a predetermined first direction (for example, from left to right) along the arrangement of the plurality of metal buttons B. In this case, the display 230 may provide an increment adjustment screen in which the predetermined increment of 5 degrees has risen (see FIG. 6). In contrast, if a drag touch D is input in a predetermined second direction (for example, from right to left) along the arrangement of the plurality of metal buttons B, the display 230 may provide an increment adjustment screen in which the predetermined increment of 5 degrees has fallen.

Then, if a predetermined second manipulation command T2 is input to the operating portion 210 converted to an active state, the display 230 may provide a new increment adjustment screen having an adjustment increment that is different from the adjustment increment of the increment adjustment screen provided thereon, in operations 330 and 340.

For example, if a user's second manipulation command T2 is input to a metal button B corresponding to a temperature adjustment function of the air conditioner 131, the display 230 may provide a new temperature increment adjustment screen of the air conditioner 131 having an adjustment increment that is different from the adjustment increment of the temperature increment adjustment screen of the air conditioner 131. The new temperature increment adjustment screen of the air conditioner 131 may be an increment adjustment screen on which temperature can be adjusted in a predetermined second increment, for example, in increments of 1 degree. In the current embodiment, the second increment may change according to a user's setting, and the second increment may be set to an arbitrary increment that is different from the first increment. In other words, the second increment may be set to be larger or smaller than the first increment. Hereinafter, for convenience of description, an example in which the second increment is set to 1 degree in regard of temperature increment adjustment of the air conditioner 131 will be described as an embodiment of the present disclosure.

Then, if a predetermined drag touch D is input to the operating portion 210, the display 230 may provide an increment adjustment screen in which the predetermined second increment has been adjusted.

For example, in the case in which the plurality of metal buttons B are arranged side by side in the left-right direction, a drag touch D may be input in a predetermined first direction (for example, from left to right) along the arrangement of the plurality of metal buttons B, as shown in FIG. 7. In this case, the display 230 may provide an increment adjustment screen in which the predetermined increment of 1 degree has risen. In contrast, if a drag touch D is input in a predetermined second direction (for example, from right to left) along the arrangement of the plurality of metal buttons B, the display 230 may provide an increment adjustment screen in which the predetermined increment of 1 degree has fallen.

Meanwhile, the input apparatus 200 according to the present disclosure may receive control commands for other devices installed in the inside of the vehicle 100, as well as a control command for adjusting temperature of the air conditioner 131 as described above.

Hereinafter, for easy understanding, various examples of manipulating the input apparatus 200 will be described.

Figure 8:
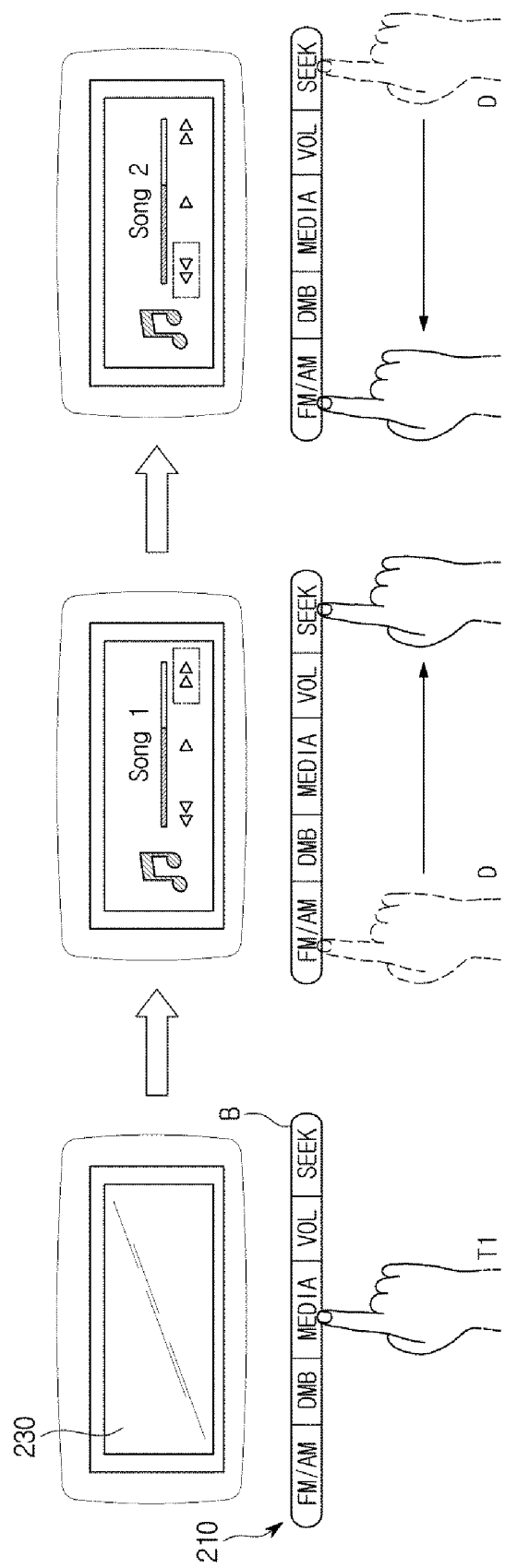
FIGS. 8 to 10 are views for describing an operation principle of an input apparatus according to exemplary embodiments of the present disclosure.

First, an example of manipulating the input apparatus 200 in regard of the audio function will be described. FIGS. 8 and 10 are views for describing an operation principle of the input apparatus 200 according to exemplary embodiments of the present disclosure. More specifically, FIG. 8 shows an example of manipulating a reproducing increment adjustment screen of audio, FIG. 9 shows an example of manipulating a progress bar adjustment screen of audio, and FIG. 10 shows an example of manipulating a volume increment adjustment screen of audio.

First, referring to FIG. 8, if a first manipulation command T1 is input to the operating portion 210, the operating portion 210 may be converted to an active state, and a reproducing increment adjustment screen of audio may be displayed on the display 230. On the reproducing increment adjustment screen of audio, album information, artist information, a progress bar, and a play icon for currently played music may be displayed.

Successively, if a drag touch D is input in a first direction to the operating portion 210, a play command for next music of the currently played music may be input. In contrast, if a drag touch D is input in a second direction to the operating portion 210, a play command for previous music of the currently played music may be input. According to some embodiments, if a drag touch D is input one time in the second direction, a command for replaying the currently played music at the beginning may be input, and successively, if a drag touch D is input one time in the second direction within a predetermined time period, a command for playing the previous music of the currently played music may be input.

Figure 9:
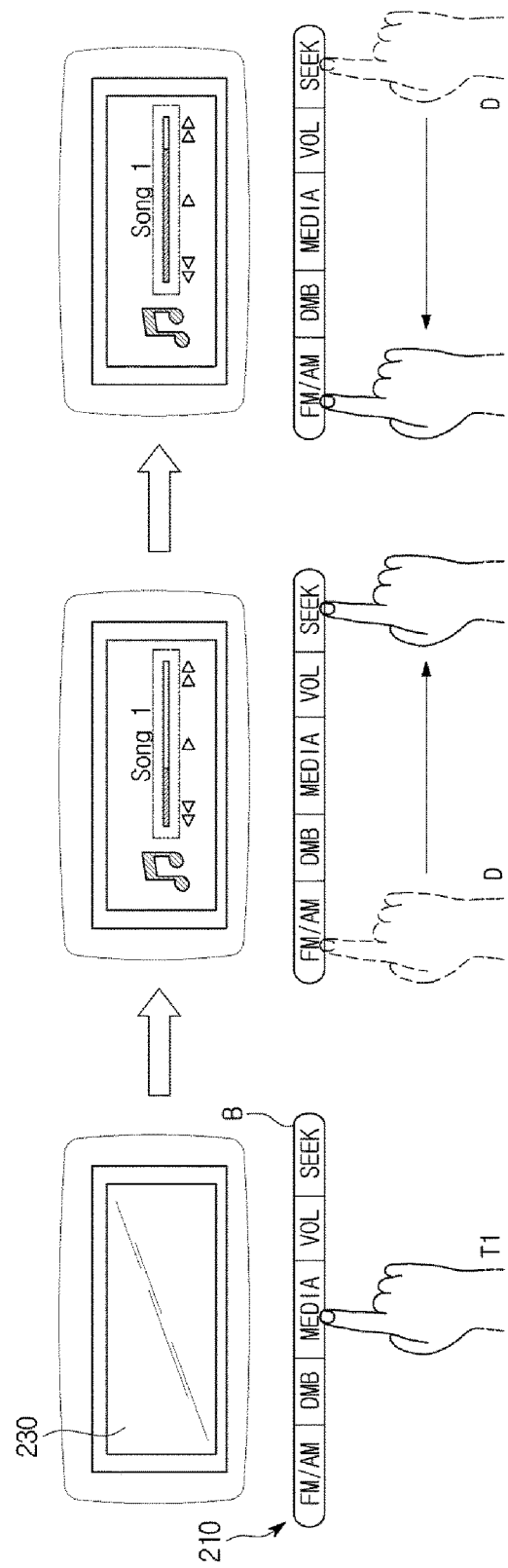
Figure 10:
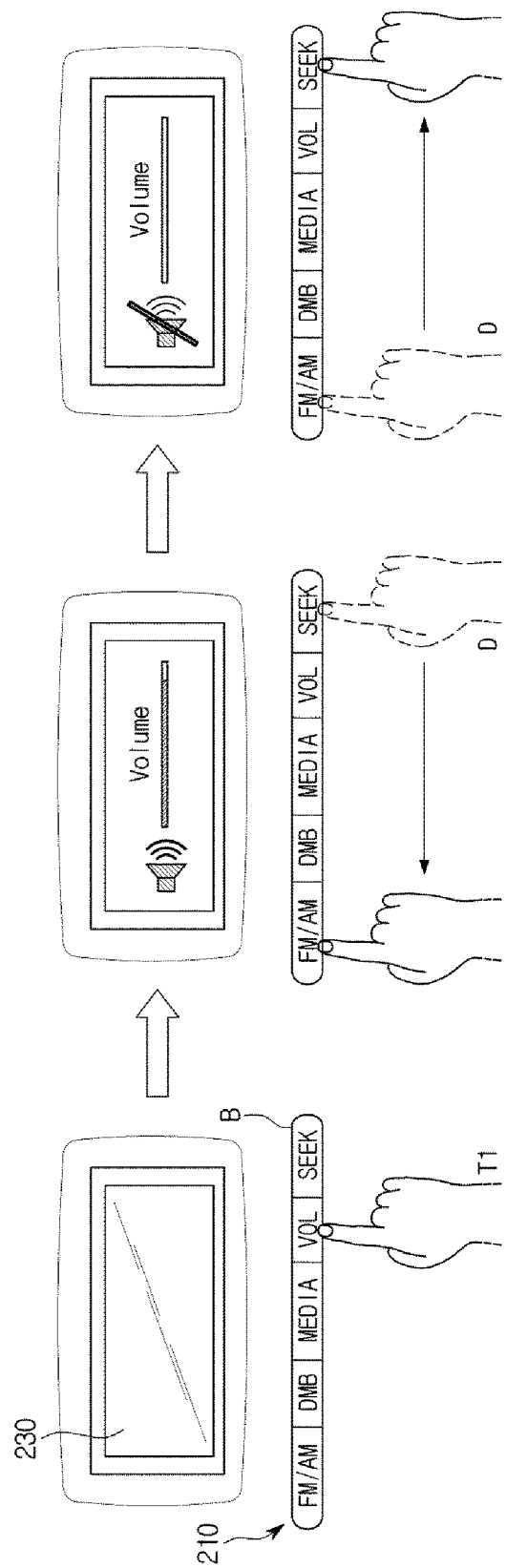

Then, referring to FIG. 9, if a first manipulation command T1 is input to the operating portion 210, the operating portion 210 may be converted to an active state, and a progress bar adjustment screen of audio may be displayed on the display 230. On the progress bar adjustment screen of audio, album information, artist information, a progress bar, and a play icon for the currently played music may be displayed.

Successively, if a drag touch D is input in the first direction to the operating portion 210, a fast-forward command for the currently played music may be input. In this case, the display 230 may provide a progress bar adjustment screen of audio in which a progress bar has moved forward by a predetermined first increment. In contrast, if a drag touch D is input in the second direction to the operating portion 210, a rewind command for the currently played music may be input. In this case, the display 230 may provide a progress bar adjustment screen of audio in which the progress bar has moved backward by the predetermined first increment.

Meanwhile, if a predetermined second manipulation command T2 is input to the operating portion 210 converted to the active state, the display 230 may provide a new progress bar adjustment screen of audio having an adjustment increment that is different from an adjustment increment of a progress bar adjustment screen of audio being provided. The new progress bar adjusting screen of audio may be a screen that can be adjusted in a second increment set to be smaller than the first increment. A user can more finely adjust the progress of currently played music based on the new progress bar adjustment screen.

Then, as shown in FIG. 10, if a first manipulation command T1 is input to the operating portion 210, the operating portion 210 may be converted to an active state, and a volume increment adjustment screen of audio may be provided on the display 230. On the volume increment adjustment screen of audio, a volume progress bar, volume value information, etc. for currently played music may be displayed.

Successively, if a drag touch D is input in the first direction to the operating portion 210, a volume increase command for the currently played music may be input. In this case, the display 230 may provide a volume increment adjusting screen of audio in which a volume progress bar has moved forward by a predetermined first increment. In contrast, if a drag touch D is input in the second direction to the operating portion 210, a volume decrease command for the currently played music may be input. In this case, the display 230 may provide a volume increment adjustment screen of audio in which the volume progress bar has moved backward by the predetermined first increment.

Figure 11:
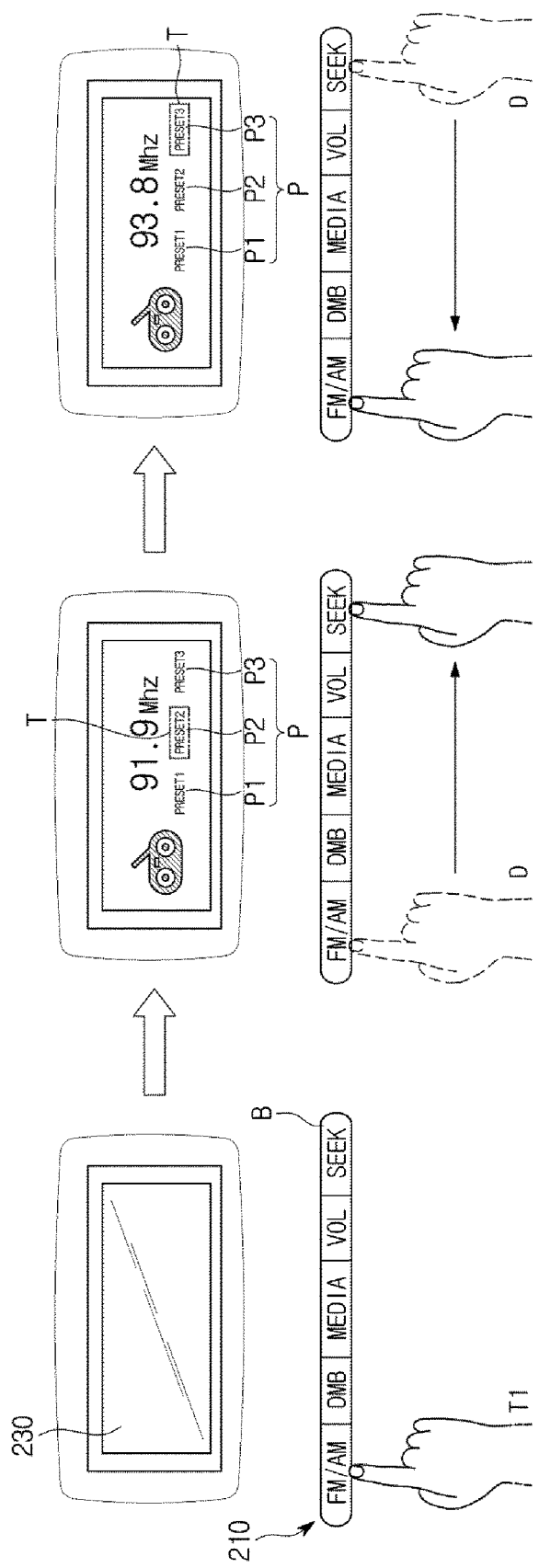
FIGS. 11 and 12 are views for describing operation principles of the input apparatus according to exemplary embodiments of the present disclosure.
Figure 12:
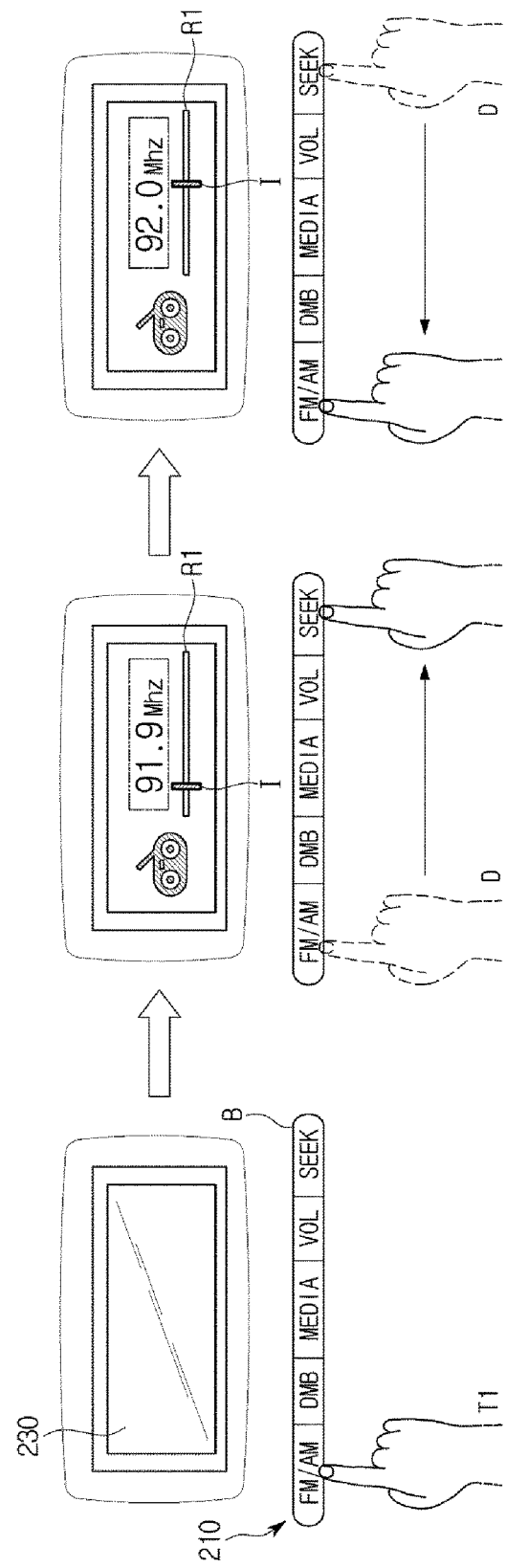

Then, an example of manipulating the input apparatus 200 according to the present disclosure in regard of a frequency change function of radio will be described. FIGS. 11 and 12 are views for describing an operation principle of the input apparatus 200 according to exemplary embodiments of the present disclosure. More specifically, FIG. 11 shows an example of selecting a preset radio frequency, and FIG. 12 shows an example of finely selecting a radio frequency.

First, as shown in FIG. 11, if a first manipulation command T1 is input to the operating portion 210, the operating portion 210 may be converted to an active state, and a frequency increment adjustment screen of radio may be provided on the display 230. The frequency increment adjustment screen of radio may display a plurality of preset icons P (P1, P2, and P3) and frequency information of a currently set channel. Also, the frequency increment adjustment screen may display a tag T representing a currently set preset icon P2 among the plurality of preset icons P (P1, P2, and P3).

Successively, if a drag touch D is input in the first direction to the operating portion 210, a command for setting a preset icon P3 next to the currently selected preset icon P2 may be input. The display 230 may display a tag T representing that the preset icon P3 has been set, on the preset icon P3. In contrast, if a drag touch D is input in the second direction to the operating portion 210, a command for setting the previous preset icon P2 of the currently selected preset icon P3 may be input. The display 230 may display a tag representing that the preset icon P2 has been set, on the preset icon P2.

Then, referring to FIG. 12, if a first manipulation command T1 is input to the operating portion 210, the operating portion 210 may be converted to an active state, and a frequency increment adjustment screen of radio may be provided on the display 230. The frequency increment adjustment screen of radio according to the current embodiment may display a bar R1 for adjusting a frequency increment, display information of a currently set frequency channel around the bar R1 for adjusting the frequency increment, and also display information of frequency channels that can be set, around the bar R1. According to exemplary embodiments, a frequency increment adjustment screen of radio on which the preset icons P of FIG. 11 and the bar R1 for adjusting the frequency increment are displayed together may be provided.

Successively, if a drag touch D is input in the first direction to the operating portion 210, a currently selected frequency channel may be adjusted to a higher channel. The display 230 may move an icon I on the bar R1 for adjusting the frequency increment in a right direction. In contrast, if a drag touch D is input in the second direction to the operating portion 210, a currently selected frequency channel may be adjusted to a lower channel. The display 230 may move the icon I on the bar R1 for adjusting the frequency increment in a left direction.

Figure 13:
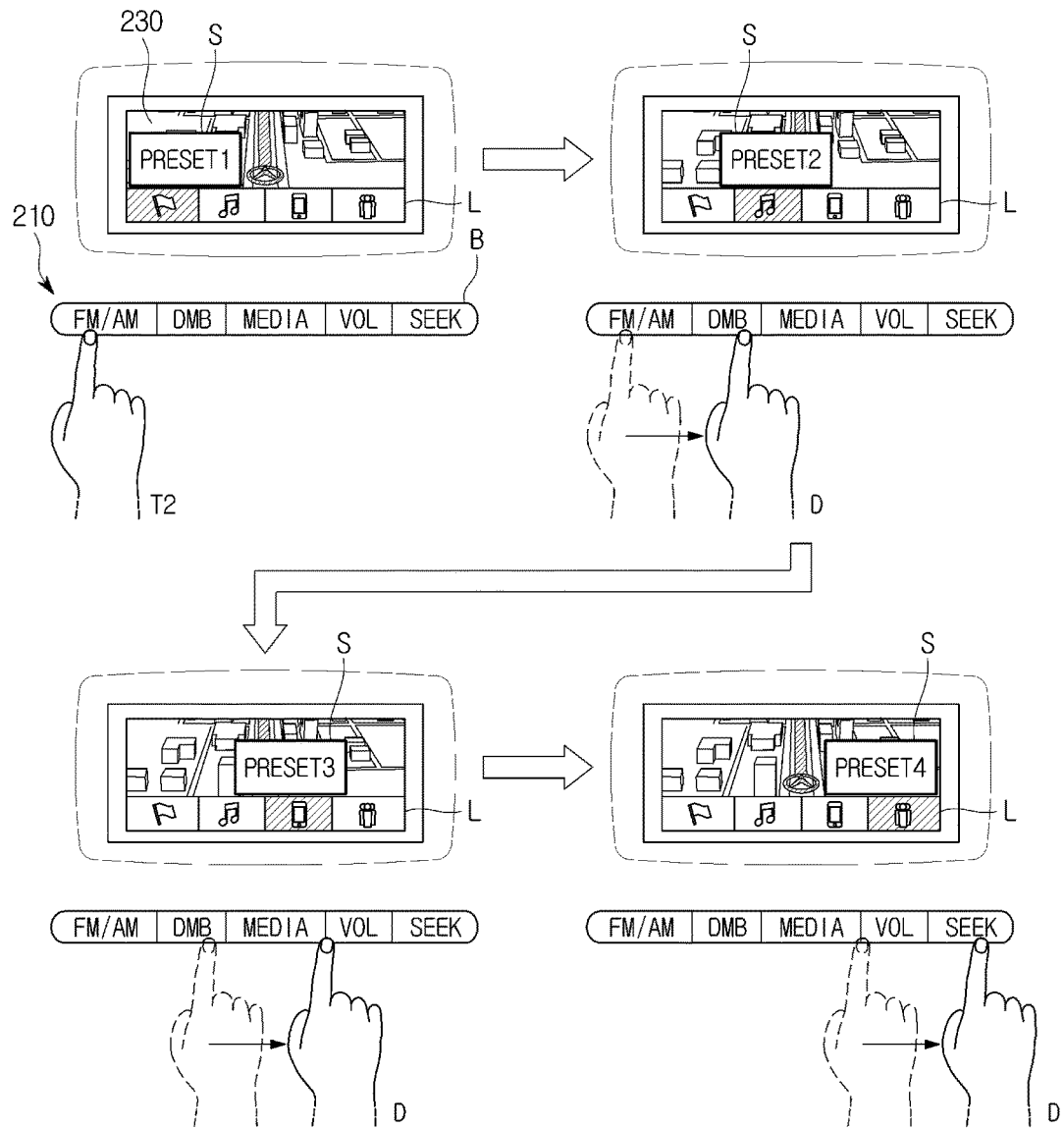
FIG. 13 is a view for describing an operation principle of an input apparatus according to exemplary embodiments of the present disclosure.

Hereinafter, an embodiment for providing a preview screen will be described. FIG. 13 is a view for describing an operation principle of an input apparatus 200 according to another embodiment of the present disclosure.

As shown in FIG. 13, if a predetermined drag touch D is input to the operating portion 210 when a plurality of functions of the vehicle 100 are being executed, an input apparatus 200 according to another embodiment of the present disclosure may control the display 230 to display a preview screen for predetermined functions.

If the drag touch D is input to the operating portion 210, the controller 220 may provide a preview screen S on the display 230, and simultaneously display a list L of the predetermined functions on a predetermined area of the display 230. The list L of the predetermined functions may be provided in the form of a plurality of icons for a plurality of predetermined functions, which are arranged side by side, and the preview screen S may be displayed around an icon for the corresponding function. However, the preview screen S may be provided in a fixed form at a predetermined area of the display 230.

FIG. 13 shows an example of providing a list of predetermined functions when the predetermined functions are a navigation function, an audio function, a call function, etc. In this case, a preview screen S may be displayed around an icon for the corresponding function when a drag touch D is input in a first direction. Also, in order for a user to easily recognize the icon providing the preview screen S, the corresponding icon may be displayed as an active state, and the other icons may be displayed as inactive states.

So far, the input apparatus 200 and the control method thereof according to the present disclosure have been described.

According to the input apparatus and the control method thereof according to an aspect of the present disclosure, a user can more intuitively operate various functions installed in the vehicle. Accordingly, it is possible to reduce cognitive load, and to reduce the dispersion of attention, when the user operates the various functions installed in the vehicle.

Also, by reducing the number of buttons installed in the inside of the vehicle, design freedom can be improved.

Although some embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An input apparatus, comprising:
an operating portion including a plurality of metal buttons for receiving a manipulation command;
a display for visually providing a control command created based on an output signal from the operating portion including the plurality of metal buttons; and
a controller for converting the operating portion including the plurality of metal buttons to an active state if a predetermined first manipulation command is input to the plurality of metal buttons, and for controlling the display to provide an increment adjustment screen in which a predetermined first increment is to be adjusted, wherein if a predetermined drag touch is input to the plurality of metal buttons after the predetermined first manipulation command is input, the predetermined first increment is adjusted,
wherein if the predetermined first manipulation command is input to the operating portion, the controller converts the operating portion to an active state to receive an operating command for a function corresponding to a metal button to which the predetermined first manipulation command is input, among the plurality of metal buttons included in the operating portion, and
wherein if a predetermined second manipulation command is input to the operating portion after the operating portion is activated, the controller controls the display to provide a new increment adjustment screen having an adjustment increment that is different from an adjustment increment of the increment adjustment screen provided thereon.

2. The input apparatus according to claim 1, wherein the drag touch is input in a predetermined first direction or in a predetermined second direction opposite to the predetermined first direction, according to an arrangement of the plurality of metal buttons.

3. The input apparatus according to claim 1, wherein the display increment provides the new increment adjustment screen having the adjustment increment that is smaller than the adjustment increment of the increment adjustment screen provided thereon.

4. The input apparatus according to claim 1, wherein if the predetermined drag touch is input to the operating portion when a plurality of functions of a vehicle are being executed, the display provides a preview screen for predetermined functions.

5. The input apparatus according to claim 1, wherein the increment adjustment screen includes at least one of a volume increment adjustment screen of audio, a reproducing increment adjustment screen of audio, a progress bar adjustment screen of audio, a temperature increment adjustment screen of an air conditioner, an air-volume increment adjustment screen of an air conditioner, or a frequency increment adjustment screen of radio.

6. The input apparatus according to claim 1, wherein each of the metal buttons includes a sensor, and a metal cover disposed on the sensor for receiving the manipulation command.

7. The input apparatus according to claim 1, wherein in the operating portion, the plurality of metal buttons is arranged side by side.

8. The input apparatus according to claim 7, wherein the drag touch is input according to an arrangement of the plurality of metal buttons.

9. A method of controlling an input apparatus, the input including an operating portion including a plurality of metal buttons for receiving a manipulation command, and a display for visually providing a control command created based on an output signal from the operating portion, the method comprising:
converting the operating portion including the plurality of metal buttons to an active state if a predetermined first manipulation command is input to the plurality of metal buttons; and
providing an increment adjustment screen in which a predetermined first increment is to be adjusted on the display, wherein if a predetermined drag touch is input to the plurality of metal buttons after the predetermined first manipulation command is input, the predetermined first increment is adjusted,
wherein the converting the operating portion comprises:
if the predetermined first manipulation command is input to the operating portion, converting the operating portion to the active state in order to receive an operating command for a function corresponding to a metal button to which the first manipulation command is input, among the plurality of metal buttons included in the operating portion, and
if a predetermined second manipulation command is input to the operating portion converted to the active state, providing a new increment adjustment screen having an adjustment increment that is different from an adjustment increment of an increment adjustment screen provided on the display.

10. The method according to claim 9, wherein the providing the new increment adjustment screen comprises providing the new increment adjustment screen having the adjustment increment that is smaller than the adjustment increment of the increment adjustment screen provided on the display.

11. The method according to claim 9, wherein the providing the increment adjustment screen comprises providing the increment adjustment screen including at least one of a volume increment adjustment screen of audio, a reproducing increment adjustment screen of audio, a progress bar adjustment screen of audio, a temperature increment adjustment screen of an air conditioner, an air-volume increment adjustment screen of an air conditioner, or a frequency increment adjustment screen of a radio.

12. The method according to claim 9, further comprising, if the predetermined drag touch is input to the operating portion when a plurality of functions of a vehicle are being executed, providing a preview screen for predetermined functions.

13. The method according to claim 9, wherein in the operating portion, the plurality of metal buttons is arranged side by side, and the drag touch is input according to an arrangement of the plurality of metal buttons.

14. The method according to claim 13, wherein the drag touch is input in a predetermined first direction or in a predetermined second direction that is opposite to the predetermined first direction, according to the arrangement of the plurality of metal buttons.

* * * * *